United States Patent [19]

Thore

[11] 4,233,814
[45] Nov. 18, 1980

[54] SUPERCHARGED INTERNAL COMBUSTION ENGINES

[76] Inventor: Bernard Thore, 95, rue de Longchamp, 75116 Paris, France

[21] Appl. No.: 934,021

[22] Filed: Aug. 16, 1978

[30] Foreign Application Priority Data

Aug. 22, 1977 [FR] France .............................. 77 25571

[51] Int. Cl.³ .............................................. F02B 37/00
[52] U.S. Cl. ...................................... 60/601; 60/606
[58] Field of Search ................. 60/600, 601, 606, 611; 123/119 C

[56] References Cited

U.S. PATENT DOCUMENTS

| | | | |
|---|---|---|---|
| 2,811,826 | 11/1957 | Alcock | 60/600 |
| 3,157,987 | 11/1964 | Pouit | 60/601 X |
| 3,270,724 | 9/1966 | Dolza | 60/611 X |

FOREIGN PATENT DOCUMENTS 458350 12/1936 United Kingdom .................... 60/601

*Primary Examiner*—Michael Koczo
*Attorney, Agent, or Firm*—Larson, Taylor and Hinds

[57] ABSTRACT

A power unit comprises an internal combustion engine adapted for operating with natural induction, supercharged by a turbine-compressor unit receiving the exhaust gases of the engine. The compressor supplies air to the engine through an intake pipe provided with an atmospheric air inlet closed by a check valve in operation under load. The power of the engine is controlled by a power control member movable by an operator between a maximum power position and an idling position. An inlet valve, placed in the air inlet of the compressor and movable between an open position and a closed position, is biased towards closure by the power control member when the latter is moved towards its idling position. A locking member responsive to air pressure at the outlet of the compressor cooperates with said inlet valve to prevent its closing as long as the air pressure at the outlet of the compressor is greater than a predetermined threshold.

7 Claims, 7 Drawing Figures

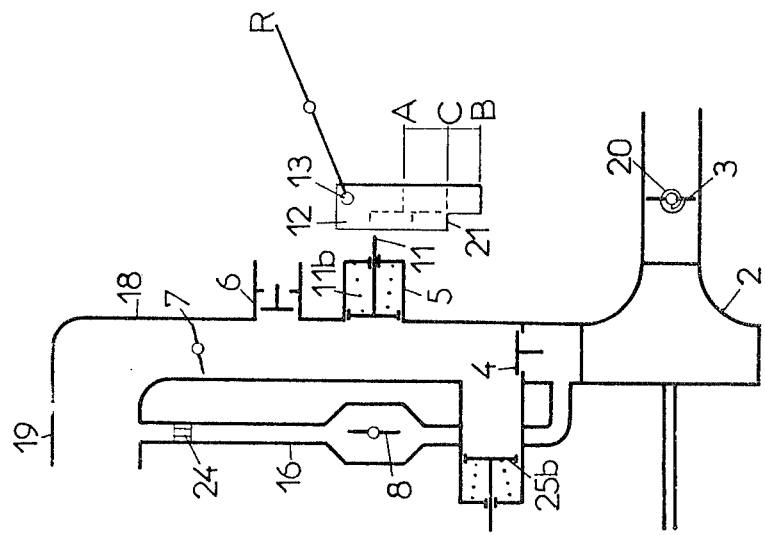
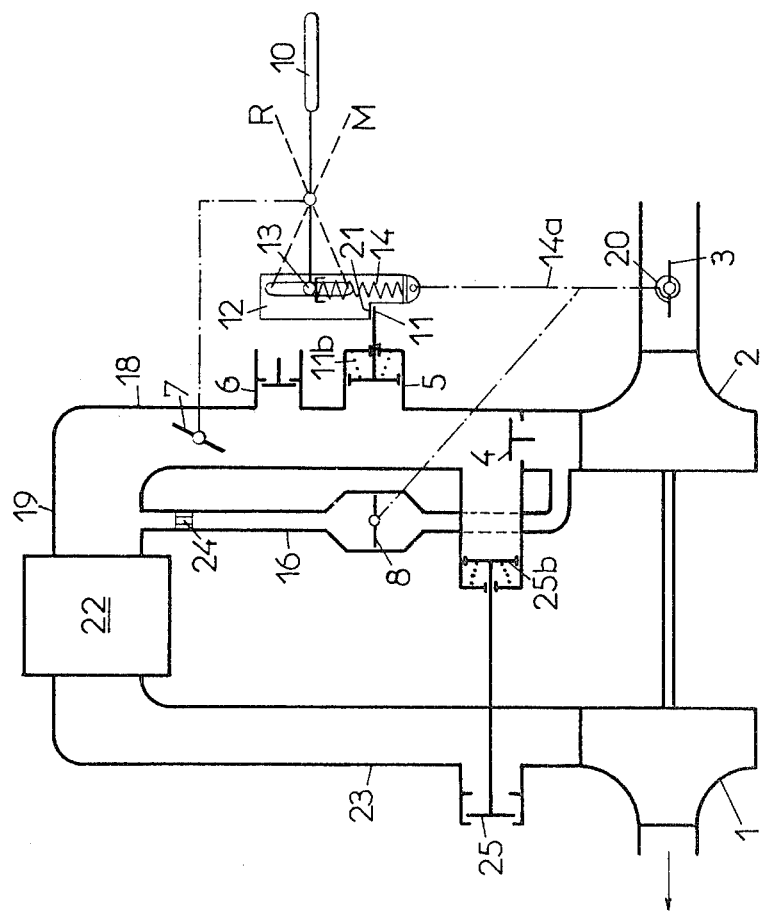

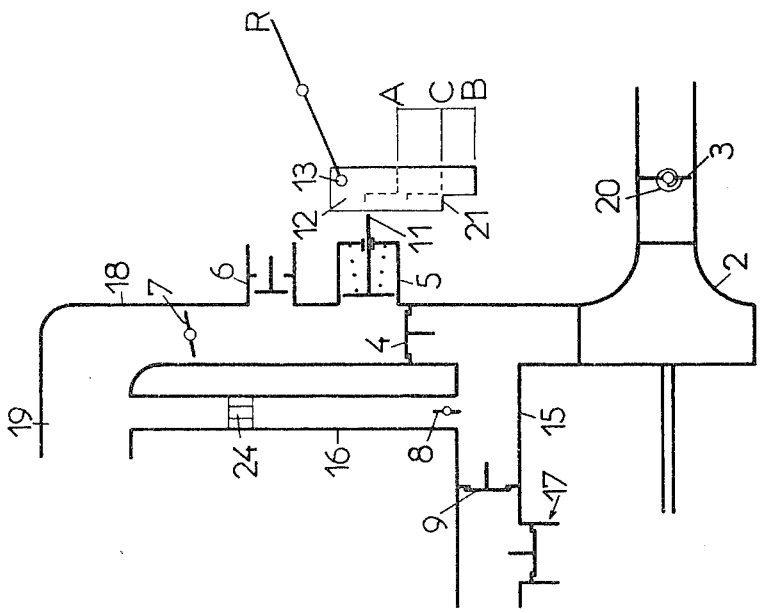
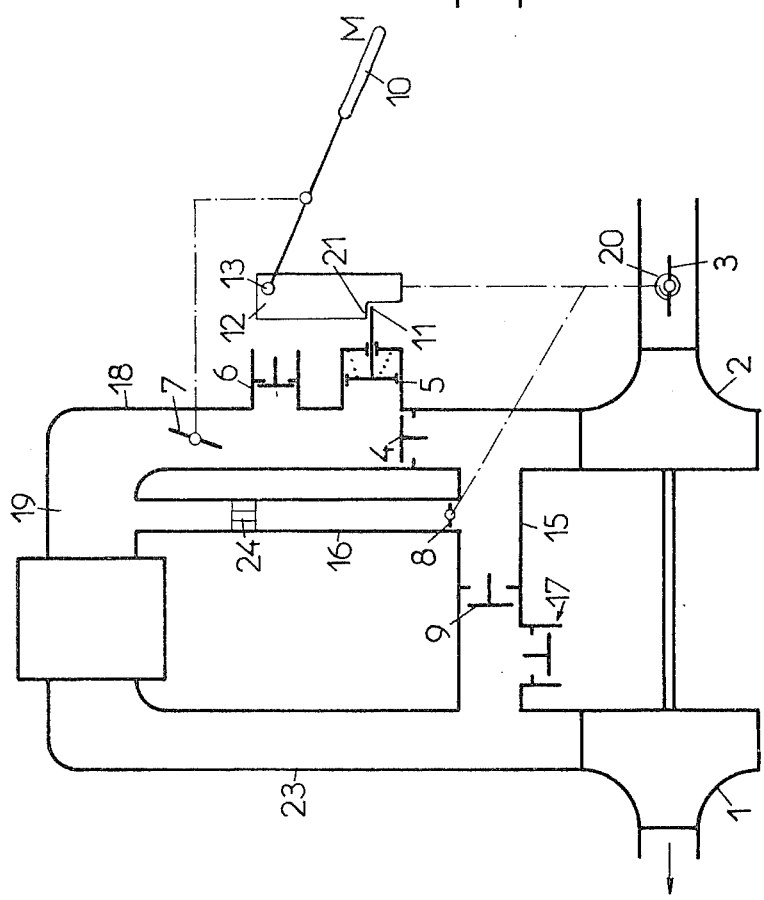

SUPERCHARGED INTERNAL COMBUSTION ENGINES

BACKGROUND AND SUMMARY OF THE INVENTION

The present invention relates to power units comprising an internal combustion engine supercharged by a turbine-compressor unit which receives driving energy from the exhaust gases of the engine.

The name "internal combustion engine" will be understood as designating any such engine having variable volume chambers, such as a spark ignition or compression ignition engine, having at least one reciprocating or rotary piston.

The invention more particularly relates to those engines whose ignition does not require that the air admitted into the chambers be pressurized, except under exceptional conditions of use (starting during very cold weather for instance) and which consequently can operate with "natural" induction.

Most power units of that type in which the energy required for the turbine-compressor unit is supplied exclusively by the exhaust gases of the engine (i.e. those units which have no auxiliary combustion chamber) have shortcomings due to the fact that the energy supplied by the exhaust gases decreases as the engine becomes unloaded. For a large range of operating speeds, this energy is insufficient, so that the power and the torque of the unit are substantially the same as those of a non-supercharged engine. Acceleration from a speed within that range is very slow because of the considerable time for the turbine-compressor unit speed to increase to a value at which it is effective.

Different solutions have been proposed to overcome the difficulty. It has been suggested to use a turbo-compressor unit which supplies an appreciable supercharging pressure for all operating speeds from a speed which is about half the rated speed and to provide a waste valve in the supercharging air circuit. The waste valve opens when the supercharging pressure exceeds a pre-determined value, selected for example with respect to the maximum combustion pressure which the engine may withstand. The simple fact that the range of speeds at which the installation operates practically without supercharging extends practically to half the rated speed shows that this solution is not satisfactory.

A power unit has also been proposed comprising an internal combustion engine capable of operating with natural induction, supercharged by a turbine-compressor unit receiving its energy solely from the exhaust gases of the engine, the compressor supplying the engine with air through an inlet pipe fitted with an inlet for atmospheric air, closed off in on-load operation, a member for adjusting the power of the engine movable between a maximum power position and an idling position, and a valve placed in the air inlet of the compressor and movable between an open position and a closed position, biased towards closing by the power adjustment member when this latter is brought to its idling position, at least beyond a pre-determined position. In that prior art unit, the power controlling member is a throttle member placed in the air intake to the engine and the air inlet valve is controlled by the position of the throttle member. That solution is not completely satisfactory since the compressor is partially or totally out of action during operating conditions in which the engine speed remains sufficient to ensure normal operation of the compressor. For example, such conditions occur during deceleration at high speed, when the engine operates as a retarder. Moreover, the arrangement cannot be used with compression ignition engines in which the amount of fuel admitted into the combustion chambers of the engine is directly metered the combustion always taking place with a considerable excess of air.

It is an object of the present invention to provide a power unit of the kind defined above, but in which the normal conditions of air intake to the turbo-compressor are maintained as long as is necessary to avoid its slowing down.

According to an aspect of the invention, there is provided a power unit comprising an internal combustion engine capable of operating without supercharging and associated with a turbine-compressor unit whose turbine is connected to receive the exhaust gases of the engine and whose compressor is connected to supply compressed air to an intake pipe of the engine which is provided with a non-return check valve adapted to admit atmospheric air into said intake pipe in response to occurence of a subatmospheric pressure in said intake pipe, a compressor inlet valve located in the air inlet of the compressor and movable between an open position and a closed position, operatively connected to a power control member movable between a maximum power position and an idling position, for controlling the power delivered by the engine, said control member biasing the inlet valve toward closure when it is moved towards its idling position, at least beyond a pre-determined position, and toward full opening when it is moved towards its maximum power position, locking means arranged to prevent closure of said compressor inlet valve, and control means subjected to the air pressure delivered by the compressor and operatively associated with said locking means for rendering said locking means effective in response to the outlet pressure of the compressor being greater than a predetermined threshold.

According to another aspect of the invention, there is provided a power unit comprising an internal combustion engine capable of operating without supercharging and associated with a supercharging turbine-compressor unit whose turbine is connected to receive the exhaust gases of the engine and whose compressor is connected to supply compressed air to an intake pipe of the engine which is provided with a non-return check valve adapted to admit atmospheric air into said intake pipe in response to occurence of a subatmospheric pressure in said intake pipe, a compressor inlet valve located in the air inlet of the compressor and movable between an open position and a closed position, operatively connected to a power control member movable between a maximum power position and an idling position for controlling the power delivered by the engine, a power control member biasing the inlet valve towards closure when it is moved towards the idling position, at least beyond a pre-determined position, and positively opening the inlet valve when it is moved towards its maximum power position, and a by-pass provided with a second non-return valve connecting the outlet of the compressor to the inlet of the turbine, in parallel flow relationship to the engine, having a sufficiently large cross-sectional area for the air supplied by the compressor which is not absorbed by the engine to flow through the by-pass pipe with a pressure drop sufficiently low for avoiding surge of the compressor.

The installation may further comprise a waste gate, typically placed in the exhaust pipe of the engine, upstream of the inlet of the turbine. This valve is adjusted to open and discharge exhaust gases directly to the atmosphere when the supercharging pressure exceeds a predetermined maximum value chosen for example with respect to the maximum combustion pressure which the engine can withstand.

The power unit thus operates with supercharging in all conditions in which the exhaust gases have sufficient energy to cause the turbine-compressor unit to operate normally, whereby a disadvantage of prior systems is overcome. In the latter, the closing of the inlet to the compressor takes place in response to a single parameter, the position of the throttle member and for a predetermined position of that member. The choice of this position is a compromise which must take into account numerous parameters, particularly the temperature and the pressure of the atmospheric air, the temperature of the engine, the temperature of the exhaust gases . . . So, unless complex correction mechanisms (not mentioned in the above-mentioned prior art documents) are provided to regulate at all times the definite position of the throttle member with respect to all these parameters, the closing of the air inlet of the compressor takes place frequently whereas the energy contained in the exhaust gases would still be sufficient for the turbine-compressor unit to ensure the supercharging of the engine.

In an advantageous embodiment of the invention, a by-pass pipe of large cross section communicates the output of the compressor with the inlet of the turbine so as to avoid compressor surge during sudden slowing down of the latter and jerks in operation.

The invention will be better understood from the following description of particular embodiments thereof, given by way of examples. The description refers to the accompanying drawings.

SHORT DESCRIPTION OF THE DRAWINGS

FIGS. 3 and 4 are simplified drawings showing another embodiment of the invention, the parts being respectively in the position corresponding to operation under load and idling;

Figure 7:
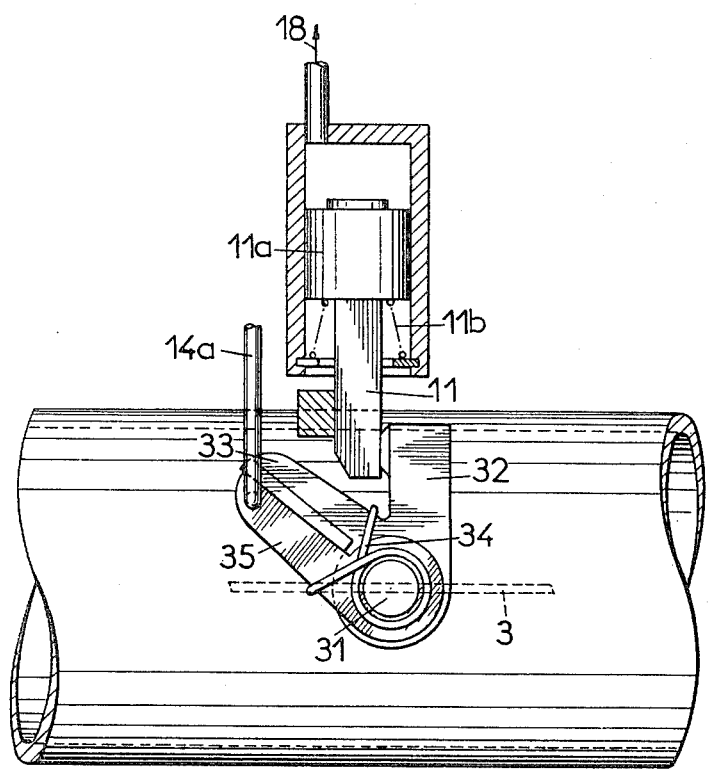

FIGS. 5 and 6, similar to FIGS. 3 and 4, show a unit according to yet another embodiment;

FIG. 7 is a simplified diagram showing a possible construction of the inlet valve and the locking member which is associated therewith.

DETAILED DESCRIPTION OF PREFERRED EMBODIMENTS

Figure 1:
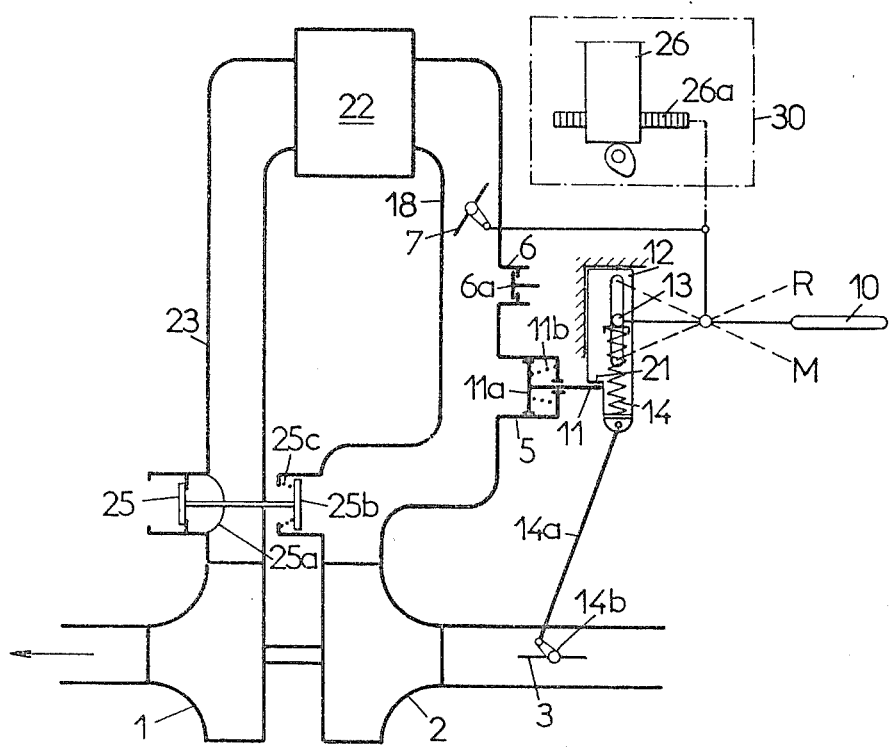
FIG. 1 is a simplified diagram of a power unit according to a first embodiment.

The power unit shown in FIG. 1 comprises an internal combustion engine 22 with variable volume combustion chambers. For simplification, it will be assumed in what follows, unless otherwise mentioned, that the engine is of the spark ignition type and is controlled by movement of a throttle valve 7 placed in the air intake pipe 18 to the engine. The flow of fuel admitted to the engine is automatically metered responsive to the air flow, so that the air/fuel mixture in the chambers of the engine is approximately stoichiometric, by means (not shown) which may be a carburetor.

Engine 22 is provided with a supercharging turbine-compressor unit comprising a compressor 2 driven by a turbine 1 which receives exhaust gases from the engine 22 through a pipe 23. The compressor 2, whose air inlet is provided with a valve 3 open in normal running, delivers air to engine 22 through intake pipe 18. Throttle valve 7 is controlled by a member 10 (actuated by an operator or by regulating means). Pipe 18 is further provided with an inlet 6 for atmospheric air, closed by a valve 6a in normal operation, when a pressure higher than the atmospheric pressure prevails in pipe 18.

In most cases, the power unit will be provided with a waste gate. In the embodiment shown in FIG. 1, the waste gate comprises a closure member 25 arranged to close a discharge aperture in pipe 23, connected by a rod 25a to a piston 25b subjected to the pressure supplied by compressor 2. A return spring 25c maintains the closure member applied against its seat as long as the pressure which prevails downstream of compressor 2 does not exceed a predetermined value. Beyond that value, the pressure force on piston 25b compresses spring 25c and lifts closure member 25 from its seat.

Control member 10 is connected to valve 3 by a resilient connection which urges the compressor inlet valve 3 in the closing direction when member 10 is moved from position M corresponding to maximum power to position R corresponding to idling (in which throttle valve 7 occupies its minimum open position). Referring again to FIG. 1, the connection comprises a slider 13 carried by member 10, movable in an elongated opening formed in a part 12 which is slidably received in a stationary guide, not shown. Between slider 13 and a flange of part 12 there is disposed a compression spring 14 for transmission of force. Part 12 is connected, by a rod 14a, to an arm 14b carried by the shaft of inlet valve 3, formed by an air-balanced butterfly valve.

Movement of part 12, from the position in which member 10 brings it when this latter is in its maximum load position, may be prevented by a releasable locking member. In the embodiment of FIG. 1, member 11 is shown as a pin carried by a piston 11a on which the outlet pressure of the compressor 2 exerts a force which is opposite that of a return spring 11b. As long as the air pressure is greater than a predetermined value Pm, it tends to move or maintains the pin to or in an advanced position, in the path of a shoulder 21 of part 12.

The device operates as follows: Once part 12 has been brought into the position in which it is shown in FIG. 1, it is retained by locking member as long as the outlet pressure of the compressor 2 exceeds value Pm. Inlet valve 3 mechanically coupled to part 12 then retains its fully opened position whatever the position of member 10, as long as the outlet pressure of the compressor exceeds value Pm.

If now member 10 is brought back to its idling position and if the pressure supplied by the compressor drops below Pm (for instance when the engine has resumed its idling speed), spring 11b pushes pin 11 back leftwards and spring 14 urges part 12 downwards until valve 3 is closed. Compressor 2 no longer supplies air, whereby its aerodynamic losses are reduced and it can remain at a speed greater than that which it would assume if valve 3 were open. Air is then supplied to the engine and through inlet 6, since valve 6a opens under the effect of the induction depression.

When member 10 is brought back towards its maximum load position M, part 12 moves up, valve 3 opens and compressor 2 (still rotating at substantial speed) can very rapidly supply a supercharging pressure. The dead time from idling is considerably reduced.

The same arrangement is applicable when the engine is of the compression ignition type and power control is by metering the fuel flow injected into the chambers. Then, control member 10 will not be coupled to a throttle valve 7 but rather to a fuel control member 30. In FIG. 1, member 30 has been shown schematically in the form of an injection pump 26 whose rack 26a is coupled to member 10 by a mechanical linkage.

In the unit shown in FIG. 1, compressor 2, engine 22 and turbine 1 are disposed in series air flow relation: the air supplied by the compressor must pass through the engine. To avoid compressor surge, it is then necessary to match the compressor to the engine for operation of the compressor far from the surge line at the rated power, which results in poor efficiency and an increase of the energy to be supplied to the turbine to drive the compressor at the speed required to provide supercharging. Moreover, the re-opening of valve 3 causes jerks harmful to the engine if the waste gate 25 is not placed in the intake thereof. Finally, the sudden slowing down of the engine in response to movement of member 10 towards idling position R and the correlative reduction of the air flow passing through engine 22 slows down the compressor 2 whereas it is desired to maintain it rotating at as high a speed as possible.

Figure 2:
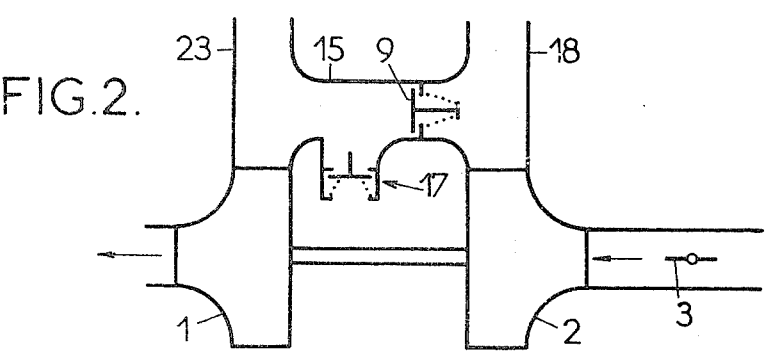
FIG. 2 is a simplified drawing showing a fraction of a unit forming a modification of that of FIG. 1.

Referring to FIG. 2 (where only the elements which differ from those illustrated in FIG. 1 are shown and the elements which correspond to those of FIG. 1 are designated by the same reference numbers) there is shown an arrangement in which the above difficulty is overcome.

A by-pass pipe 15 provided with non-return valve means 9 allows air to flow from compressor 2 to turbine 1. Pipe 15 has a cross-sectional area sufficient to let pass all the air supplied by the compressor and which does not flow through the inlet pipe 18 and engine 22, with a pressure loss less than that at which there is surge of the compressor 2. Compressor 2 may thus be matched for operating close to the surge line, with very good efficiency. Pipe 15 may further be provided with a waste gate 17, calibrated to let the air escape to the atmosphere when the supercharging pressure exceeds a predetermined value Pm corresponding for example to the maximum combustion pressure acceptable in the engine. Waste gate 17 may replace valve 25 of FIG. 1. It is located in a zone cooled by the air coming from compressor 2, so operates under favourable conditions and is less expensive.

Different connecting arrangements of control member 10 and valve 3 may be used. In the embodiment shown by way of example in FIG. 7, valve 3 is a butterfly valve fixed on a rotary shaft 31. Shaft 31 carries a finger 32 cooperating with pin 11 of piston 11a. A second finger 33, also secured to shaft 31, is provided with a flat which a return spring 34 forces into engagement against a lever 35 rotatably mounted on shaft 31. A rod 14a connects lever 35 to member 10.

The embodiment of FIG. 2, like that of FIG. 1, can be used whether the engine is controlled by a throttle valve placed in the air inlet pipe or by metering of the amount of fuel injected into the cylinders.

On the other hand, the embodiment shown in FIGS. 3 and 4 can only be used if the engine is provided with a throttle member. In FIGS. 3 and 4, the parts corresponding to those of FIGS. 1 and 2 are again designated by the same reference numbers. Referring to FIG. 3, the power unit comprises, besides the elements of the embodiment of FIG. 1, a pipe 16 connecting a zone 19 of intake pipe 18, which is situated downstream of throttle valve 7, and the outlet of compressor 2. It also comprises a non-return valve 4 located in pipe 18 downstream of the junction of pipe 16 and upstream of air inlet 6 controlled by a check valve. In pipe 16 are disposed a calibrated constriction 24 and a valve 8 connected to part 12 by a mechanical linkage (shown schematically by a dot-dash line). The linkage is such that valve 8 is closed when valve 3 is open and conversely.

During normal operation of the power unit (when the engine is under load) throttle valve 7 is at least partially open, valve 8 is closed and valve 3 is wide open. The elements then are in the positions shown in FIG. 3.

When, following movement of control member 10 towards idling position R, the supercharging pressure falls below a threshold Pm (exhaust gases no longer supplying sufficient energy to the turbine 1), return spring 11b pulls back locking pin 11. Part 12 is released, can slide downwards and closes valve 3. This closing takes place as soon as part 12 has travelled over path AC (FIG. 4). Part 12 then continues its movement under the action of spring 14 by compressing a spring 20 placed between connection 14a and valve 3 and fully opens valve 8, until it reaches B.

Pipe 16 then provides a communication between compressor 2 and zone 19 situated downstream of throttle valve 7 and significant disturbances in the amount of air fed to the engine are avoided. Calibrated restriction 24, which participates in the reduction of the flow in pipe 16, may in certain cases be omitted.

Pipe 16 thus maintains the rotor of compressor 2 in a low pressure enclosure, which diminishes the losses by air friction and reduces the energy necessary to rotate the rotating assembly of the turbine-compressor unit to that required to overcome the frictional resistances.

On a further call for power, caused by movement of member 10 to position M, throttle valve 7 opens, part 12 begins to travel up again and, over path BC, closes valve 8. Energy supply to turbine 1 is resumed. The rotary assembly accelerates so that, when part 12 moves over path AC and opens valve 3 again, the compressor 2, again supplied with air, very quickly provides the full supercharging pressure.

As in the embodiment of FIG. 1, there is however aerodynamic braking of the compressor when throttle valve 7 closes; when engine 22 slows down, some limited risks of surge and erratic overpressures exist. They are avoided in the embodiment of FIGS. 5 and 6 which has a by-pass pipe similar to that of FIG. 2. By-pass pipe 15 is again provided with a non-return valve 9 and a waste gate 17. The communication conduit 16 provided with valve 8 connects zone 19 (under depression when throttle valve 7 is at least partially closed) and by-pass pipe 15 upstream of non-return means 9.

In normal operation (FIG. 5), valve 8 is closed, non-return valve 4 is open, air inlet 6 is closed and non-return valve 9 is open.

If the supercharging pressure falls below Pm, Part 12 moves downwards according to the same procedure as in the preceding embodiments. As soon as position C is reached, valve 3 closes and valve 8 opens responsive to travel CB of part 12. When throttle valve 7 closes and the engine slows down, there cannot be surge of compressor. On a further call of power, the possible pressure pulses are dampened by waste gate 17, already provided to limit the supercharging pressure in normal operation.

Valve 8 may be opened without valve 3 being necessarily closed if restriction 24 in pipe 16 is suitably calibrated, particularly to correct excessive richness, possibly caused by closure of butterfly valve 7 whereas the engine is still rotating at high speed. But, in any case, communication conduit 16 is open when valve 3 is closed.

In view of the low energy required for the rotating unit running when the compressor is relieved of its aerodynamic work by closure of its air inlet, particularly if the compressor communicates with the depression zone situated downstream of the throttle valve, means may be provided for driving the rotating unit using the power of the engine under such circumstances. That may be done with a fast pneumatic motor which then receives air from a small additional compressor driven by the engine.

To rotate this pneumatic motor, the depression existing in the zone situated downstream of the partially closed butterfly valve for the gases, may be used.

Numerous alternative embodiments are possible. According to an important modification of the embodiments of FIGS. 2 and 5–6, the inlet valves 3 is mechanically coupled to control member 10 for positive opening and closure of valve 3 responsive to movement of member 10 to positions M and R, respectively.

That modified embodiment, while less advantageous when used in conjunction with a high supercharging rate of the engine, remains satisfactory in other cases.

The combination of inlet valve 3 positively opened when the engine is loaded from idling and by-pass pipe 15 makes it possible to achieve a high compressor efficiency, a removal of compressor surge and lessing of compressor aerodynamic braking upon slowing down of the engine.

I claim:

1. A power unit comprising:
   an internal combustion engine capable of operating without supercharging,
   a supercharging turbine-compressor unit whose turbine is connected to receive the exhaust gases of the engine and whose compressor is connected to supply compressed air to an intake pipe of the engine,
   a non-return check valve connected to said intake pipe for admitting atmospheric air into said intake pipe in response to occurence of a subatmospheric pressure in said intake pipe,
   a power control member movable between a maximum power position and an idling position,
   a compressor inlet valve located in the air inlet of the compressor and movable between an open position and a closed position, operatively connected to said power control member for being biased toward closure when the latter is moved towards its idling position, at least beyound a pre-determined position, and for being moved toward full opening when the latter is moved towards its maximum power position,
   locking means arranged to prevent closure of said compressor inlet valve,
   and control means subjected to the air pressure delivered by the compressor and operatively associated with said locking means for rendering said locking means effective in response to the outlet pressure of the compressor being greater than a predetermined threshold.

2. A power unit according to claim 1, wherein the locking means comprises a lock member subjected to a force due to the outlet pressure of the compressor and biasing the lock member toward a projected position in which it prevents closure of said compressor inlet valve, and a calibrated return spring operatively associated with said lock member and biasing the latter out of said projected position.

3. A power unit according to claim 1, further comprising a by-pass pipe provided with a second non-return valve connecting the outlet of the compressor to the inlet of the turbine, in parallel flow relationship to the engine, having a sufficiently large cross-sectional area for the air supplied by the compressor which is not absorbed by the engine to flow through the by-pass pipe without appreciable pressure loss.

4. A power unit according to claim 1, further comprising a waste gate which discharges to the atmosphere a gas consisting of one at least of air supplied by the compressor and exhaust gases delivered by the engine when the super-charging pressure exceeds a pre-determined value.

5. A power unit according to claim 1, further comprising:
   a non-return valve located in the intake pipe upstream of the atmospheric air inlet check valve,
   a throttle valve located downstream of the atmospheric air inlet check valve, limiting a variable flow area, operatively connected to the power control member and movable between a maximum open position corresponding to a maximum load of the engine and a minimum open position for idling operation of the engine,
   and a communication conduit connecting the intake pipe of the engine downstream of the throttle means and the intake pipe upstream of the non-return valve, said conduit being provided with additional valve means which are open at least when the air inlet valve of the compressor is closed.

6. A power unit according to claim 3, further comprising:
   a second non-return valve located in the intake pipe of the engine between the branching off of the by-pass pipe and the atmospheric air inlet,
   a throttle valve located in the intake pipe of the engine downstream of the atmospheric air inlet and limiting an adjustable air flow cross-sectional area for controlling the air fed to the engine together with fuel, coupled to the power control member and movable between a maximum open position corresponding to maximum load and a minimum open position corresponding to idling,
   and a communication conduit connecting the intake pipe downstream of the throttle valve and the intake pipe upstream of the non-return valves of the intake pipe and of the by-pass pipe, open at least when the air inlet valve of the compressor is closed.

7. A power unit according to claim 3 or 6, further comprising a waste gate for discharge to the atmosphere, adjusted to open at a pre-determined pressure, located in the by-pass pipe downstream of the second non-return valve thereof.

* * * * *